United States Patent
Billy

(10) Patent No.: US 9,469,256 B2
(45) Date of Patent: Oct. 18, 2016

(54) THERMO-ACOUSTIC PROTECTION STRUCTURE FOR A ROTATING MACHINE

(71) Applicant: GE Energy Products France SNC, Belfort (FR)

(72) Inventor: Frédéric Billy, La Montagne (FR)

(73) Assignee: GE Energy Products France SNC, Belfort (FR)

( * ) Notice: Subject to any disclaimer, the term of this patent is extended or adjusted under 35 U.S.C. 154(b) by 0 days.

(21) Appl. No.: 14/515,649

(22) Filed: Oct. 16, 2014

(65) Prior Publication Data
US 2015/0129354 A1 May 14, 2015

(30) Foreign Application Priority Data
Nov. 13, 2013 (FR) .................................... 13 61082

(51) Int. Cl.
| F02C 7/24 | (2006.01) |
| B60R 13/08 | (2006.01) |
| F02K 1/82 | (2006.01) |

(52) U.S. Cl.
CPC ............ B60R 13/0815 (2013.01); F02C 7/24 (2013.01); F02K 1/827 (2013.01); F05D 2250/183 (2013.01); F05D 2250/38 (2013.01); F05D 2260/96 (2013.01)

(58) Field of Classification Search
CPC ...... B60R 13/0815; F02C 7/24; F02K 1/827; F05D 2260/96
USPC ........ 181/210, 213, 214, 224, 225, 290, 292
See application file for complete search history.

(56) References Cited

U.S. PATENT DOCUMENTS

| | | | | | |
|---|---|---|---|---|---|
| 3,542,152 A | * | 11/1970 | Oxx, Jr. | .................. | B64D 33/02 181/214 |
| 3,983,956 A | * | 10/1976 | Manhart | ............... | E01F 8/0052 181/210 |
| 4,084,367 A | * | 4/1978 | Saylor | .................. | B29D 24/005 181/292 |
| 4,106,587 A | * | 8/1978 | Nash | .................... | G10K 11/172 181/213 |
| 4,167,598 A | * | 9/1979 | Logan | ....................... | B32B 3/28 181/288 |
| 4,298,090 A | * | 11/1981 | Chapman | .................. | F02C 7/24 181/286 |
| 4,416,349 A | * | 11/1983 | Jacobs | .................... | G10K 11/16 181/208 |
| 5,907,932 A | * | 6/1999 | LeConte | ............... | E04B 2/7411 181/210 |
| 6,857,669 B2 | * | 2/2005 | Porte | ...................... | B64D 29/00 285/368 |
| 7,467,687 B2 | * | 12/2008 | Mitchell | ............... | E04B 1/8218 181/200 |

(Continued)

FOREIGN PATENT DOCUMENTS

EP            1657374 A2 *  5/2006  ........... E04B 1/8218

Primary Examiner — Jeremy Luks
(74) Attorney, Agent, or Firm — Sutherland Asbill & Brennan LLP

(57) ABSTRACT

The application provides a thermo-acoustic protection structure for a rotating machine. The thermo-acoustic protection structure includes an upper wall and a parallel lower wall, and between them is placed at least one acoustic absorbent material. The upper wall and the lower wall being connected with at least one connecting element of an extended form. The connecting element presenting, in transverse section, at least one portion, curved or rectilinear, that is non-orthogonal to the two walls. A length of the connecting element between the upper wall and the lower wall is greater than a distance between the upper wall and the lower wall. The connecting element further presents in transverse section at least one edge.

10 Claims, 6 Drawing Sheets

(56) References Cited

U.S. PATENT DOCUMENTS

| | | | |
|---|---|---|---|
| 7,588,212 B2* | 9/2009 | Moe | B64D 15/12 244/134 D |
| 8,028,802 B2* | 10/2011 | Durchholz | F02C 7/045 181/210 |
| 2007/0278035 A1* | 12/2007 | Mitchell | B63G 13/02 181/290 |
| 2009/0266645 A1* | 10/2009 | Suzuki | E01F 8/0035 181/290 |
| 2011/0108357 A1* | 5/2011 | Vauchel | F02K 1/827 181/222 |

* cited by examiner

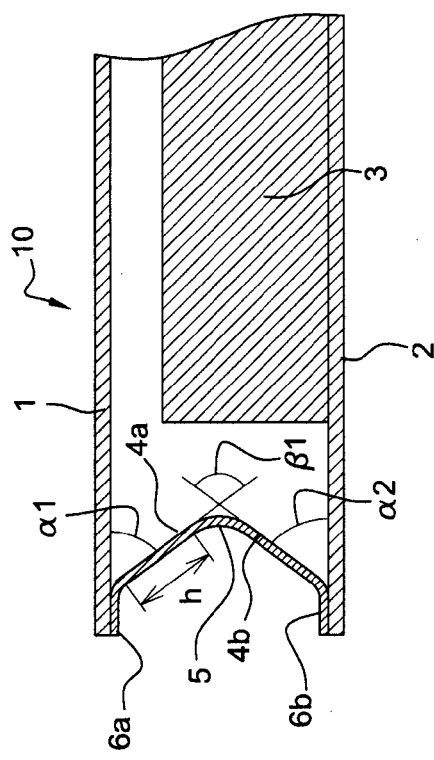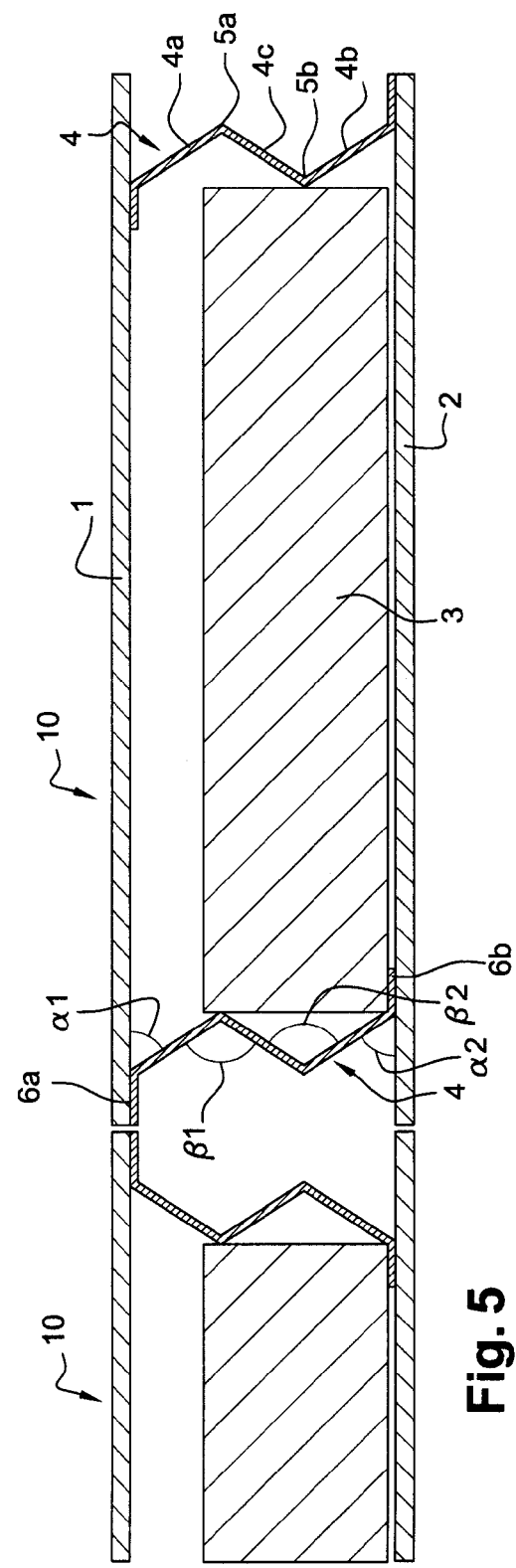

THERMO-ACOUSTIC PROTECTION STRUCTURE FOR A ROTATING MACHINE

TECHNICAL FIELD

This invention provides a thermo-acoustic protection structure for rotating machines and more particularly provides a structure in which an absorbent acoustic material is placed therein. Specifically, the invention concerns the field of thermo-acoustic protection for rotating machines and their equipment, such as gas turbines or alternators.

BACKGROUND OF THE INVENTION

The noise generated by rotating machines and their equipment may have high acoustic power levels that can attain 130 dB(A) (weighted decibel A) to 160 dB(A) and which can spread to neighboring equipment. For example, a protective enclosure, air inlet ducts, or air outlet ducts of a gas turbine may be the preferred paths for spreading acoustic waves.

Thus, a reduction in the noise radiated by the equipment is possible with the use of panels of an appropriate structure. In general, the structure of panels may have at least two walls, one external sheet and one internal sheet, with at least one layer of acoustic insulation material placed between the two sheets, and stiffeners or binding elements between the panels in which the elastic dampener methods may dissipate the transmission of vibrations through the structure.

The acoustic phenomenon in the panel structures may be classified into three types:
  Reflection: a part of the acoustic wave is sent to an internal part of the equipment.
  Absorption: dissipation of energy from a wave in the walls and in the materials (or air) placed between the walls.
  Transmission: emission of energy by vibration of the entire structure towards the exterior of the equipment.

As described in the document EP 1 657 374, the acoustic panels are made of metal. The panel design is based on the theory that mass is the main factor providing for acoustic reduction. This is based on the important fact that the more the mass increases the more the noise may be reduced. Thus, the acoustic panels including the metal sheets may provide a noise reduction by the effect of mass. A porous material also provides a reduction through the effect of viscosity and friction. Dampers dispel the vibrations and the acoustic energy between the external and internal walls, as these elements are typically composed of an elastic or flexible material such as rubber.

Absorption of acoustic waves in a panel structure according to the documents EP 2 017 826 and FR 2 356 820 may be executed by Helmholtz resonators, particularly for applications in an air inlet close to a gas turbine compressor. Further, as proposed in the document U.S. Pat. No. 4,084,367, Helmholtz resonators may be used for the acoustic absorption of frequency waves in the range of 250 and 2000 Hz. In the document FR 2 356 820, resonator chambers of various volumes or lengths ensure the stifling of the noise over a wide range of frequencies.

As far as the dampening of vibrations is concerned, document U.S. Pat. No. 5,907,932 proposes two horizontal connection elements between two sheet panels and one dampening element between the connecting elements absorb the vibrations crossing the structure. Document U.S. Pat. No. 7,467,687 proposes the use of two elastic elements on either side of a connecting element and placed at an interface between the element and each sheet. The vibration dampening elements are typically made of rubber or elastic material. Thus, the acoustic absorption is carried out either by an absorbent material or by resonators. Reduction of the acoustic transmission phenomenon through the structure is realized by the vibration dampers with elements typically of an elastic material.

The transmission and spreading of noise through structural walls, including through the insulating material, may cause the excitation of resonance modes of the structure through solid vibration, thus creating radiation of noise by the surface of the external wall. This phenomenon may be reduced by the multiplication of vibration damper points in all of the elements connecting the structure and the panels. This multiplication tends to increase the number of elements of the structure and may extend the assembly time of the panels.

In fact, during maintenance operations, it is sometimes necessary to carry out the removal and reassembly of the acoustic structure around the equipment, without it being guaranteed that the resulting acoustic performances may be equivalent to those provided initially. In particular, the elastic damper elements, cleared of vibrations, may age due to the high temperatures and vibration levels characteristic in the operation of the rotating machines.

SUMMARY OF THE INVENTION

This invention aims at resolving these disadvantages. In particular, the invention proposes a thermo-acoustic protection structure for a rotating machine. The thermo-acoustic protection structure allow releasing or coming in addition to the elastic vibration dampening elements, in order to reduce the acoustic transmission phenomenon, while ensuring clearance or reduction of acoustic waves. Another objective of the invention is to provide a structure that is easy to mount and economical to manufacture. Thus, the invention is aimed a thermo-acoustic protection structure for the rotating machine.

The structure according to the invention may include an upper and a parallel lower wall, and between which is placed at least one acoustic absorbent material. The upper and lower walls being connected with at least one connecting element of an extended form. The connecting element presenting, in transverse section, at least one portion, particularly curved or rectilinear, that is not orthogonal to the two walls. A length of the connecting element between the upper wall and the lower wall is greater than the distance between the upper wall and the lower wall. The connecting element further presents at least one edge in the transverse section Thus, the geometry of the connecting element, that presents one or several deviations as compared to the normal between the walls, means that the transverse length of the connecting element is increased. This increase allows clearances at low frequencies of the proper modes by an increase in the length of the connecting element while maintaining a low encumbrance of the panel. In this geometry, the reduction in the acoustic waves of the connecting element is favored along the width of the part. Thus, the magnitude of the resonance lying between 250 Hz and 2000 Hz becomes lower, which reduces the acoustic transmission at these frequencies.

By an edge in terms of the invention, we understand the term to mean a junction area between two non-parallel adjacent portions, whether straight or curved. The connecting element may include an upper contact area, intended for the connection of the element with the lower wall, as well as a number of the rectilinear or curved portions, the adjacent portions being non-parallel and joining each other at an edge. Thus, the sum of the lengths of the different portions is greater than the distance between the upper wall and the lower wall. The connecting element may include an upper contact area and/or a lower contact area, or no contact area at the ends of the connecting element. The rectilinear portions may be of same length or different lengths.

The edges are advantageously obtained by folding, particularly of a single part, which renders the assembly procedure of the structure simple and less expensive. In order to simplify the assembly process of the structure, the connecting element advantageously may include a number of rectilinear options. The angle between the upper wall and the upper contact area may be equal to the angle between the lower wall and the lower contact area, more or less four degrees, and the jutting angle between the upper wall and the upper contact area and of the angle between the lower wall and the lower contact area, more or less four degrees.

The structure may include a damper element of a type of a viscoelastic material, placed between the upper contact area and the upper wall and/or between the lower contact area and the lower wall. The surface between the upper contact area and the edge of the upper wall may be between 10 and 20% of the upper wall area and the surface between the lower contact area and the edge of the lower wall may be between 10 and 20% of the lower wall area.

In the transverse section, the length of the lower contact area is preferably greater than 10% of the total length of the contacting element and the length of the upper contact area is preferably greater than 10% of the total length of the contacting element. The acoustic absorbent material may include melamine, rockwool, glass, foam, and/or balls. The thickness of the acoustic absorbent material is advantageously at least equal to 50% of the distance between the lower wall and the upper wall. The fixing of the connecting element to the lower wall and/or upper wall may be carried out by welding. The fixing of the connecting element to the lower wall and/or upper wall may be a detachable fastening.

BRIEF DESCRIPTION OF THE DRAWINGS

Other characteristics and benefits of this invention clearly appear on reading of the following description provided as by way of illustrative and non-limiting example in reference to the designs attached in which:

FIG. 4 is a transverse sectional view of a thermo-acoustic protection structure for the rotating machine according to the invention, in compliance with a third execution mode.

FIG. 5 is a transverse sectional view of a thermo-acoustic protection structure according to the invention, in compliance with a fourth execution mode.

DETAILED DESCRIPTION

Figure 1:
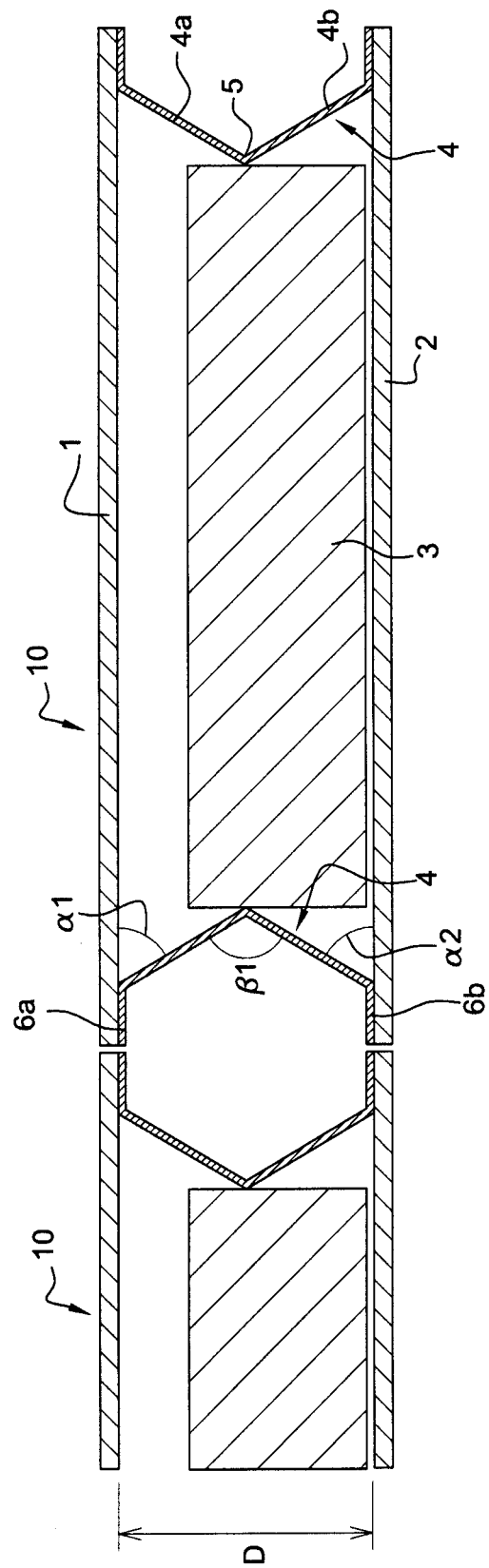
FIG. 1 is a transverse sectional view of a thermo-acoustic protection structure for the rotating machine according to the invention, in compliance with a first execution mode.

As illustrated in FIG. 1, a thermo-acoustic structure for a rotating machine according to the invention may include at least one panel 10. Each panel 10 may include an upper wall 1 (also called a sheet of the external structure or fencing) and a lower wall 2 (also called an internal sheet), the lower wall 2 being generally a perforated sheet. Between the external sheet 1 and the internal sheet 1 is placed one or several layers of an acoustic absorbent material 3, typically in at least 50% of the space lying between the upper wall 1 and the lower wall 2. For each panel 10, at least one connecting element 4 connects the external sheet 1 and the internal sheet 2. By way of example, in FIG. 1, two connecting elements 4 are used for each panel 10.

In the structure according to the invention, the connecting element 4, in transverse section, is not fixed entirely perpendicular to the walls 1, 2 (i.e., the connecting element 4 may include at least one portion 4a, 4b not perpendicular to the walls 1, 2), in a manner that, in transverse section, the length of the connecting element 4 between the upper wall 1 and the lower wall 2 may be greater than the distance D between the upper wall 1 and the lower wall 2.

According to the first mode of execution of FIG. 1, the connecting element 4 bears a single edge (or folding or fold) 5 marking two rectilinear portions not aligned 4a and 4b. The edge 5 may be located in the longitudinal symmetry level of the connecting element 4, but not necessarily. The two rectilinear portions 4a, 4b may thus be of equal length.

Thanks to the non-vertical portions 4a, 4b, the length of the connecting element 4 between the upper wall 1 and the lower wall 2 may be greater than the distance D between the upper wall 1 and the lower wall 2, which allows reducing the phenomenon of acoustic transmission in a certain frequency range, while limiting the encumbrance.

The connecting element 4 may also include at its ends an upper contact area 6a, intended for the connection of the connecting element 4 with the upper wall 1, and eventually a lower contact area 6b, intended for the connection of the connecting element with the lower wall 2. A damper element 7 of a type of a viscoelastic material or other may be inserted between the upper contact area 6a and the upper wall 1 and/or between the lower contact area 6b and the lower wall 2 (FIG. 3).

An acute angle between the upper portion 4a and the upper wall 1 is $\alpha 1$. An acute angle between the lower portion 4b and the lower wall 2 is $\alpha 2$. $\alpha 1$ may be equal to $\alpha 2$ (FIG. 1), with a tolerance of four degrees. $\alpha 1$ also may be different from $\alpha 2 \pm 4°$ (FIG. 3). The outer corner (i.e., the angle lower than 180°) between the two portions 4a and 4b is $\beta 1$ and may be equal to the sum of $\alpha 1$ and $\alpha 2$, also with a tolerance of four degrees. Thus, at least two connecting elements 4 allow the assembly of a structure with two parallel walls 1, 2. Furthermore, each contact area 6a, 6b represents at least 10% of the total surface of the connecting element 4. Each contact area 6a, 6b may be fixed to the walls 1, 2 by welding or by a detachable fastening, possibly with a damper element 7.

Figure 2:
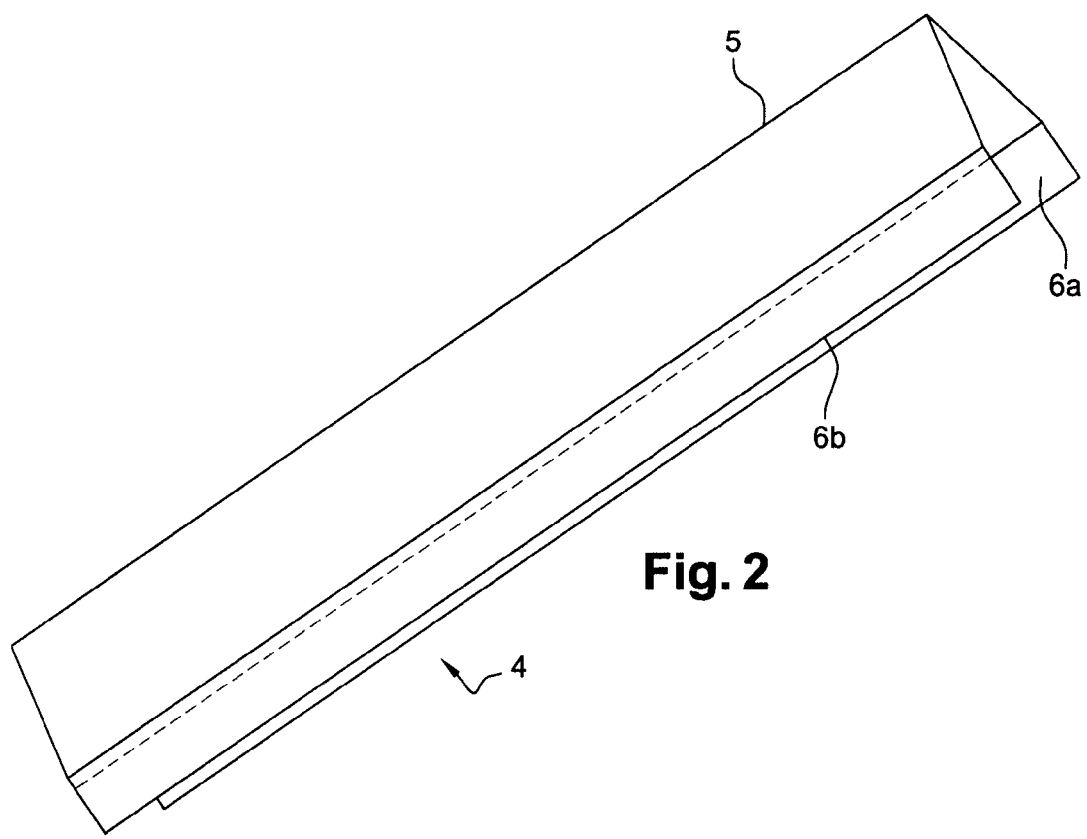
FIG. 2 is a perspective view of the connecting element of FIG. 1.

FIG. 2 illustrates in perspective the connecting element 4 of FIG. 1.

Figure 3:
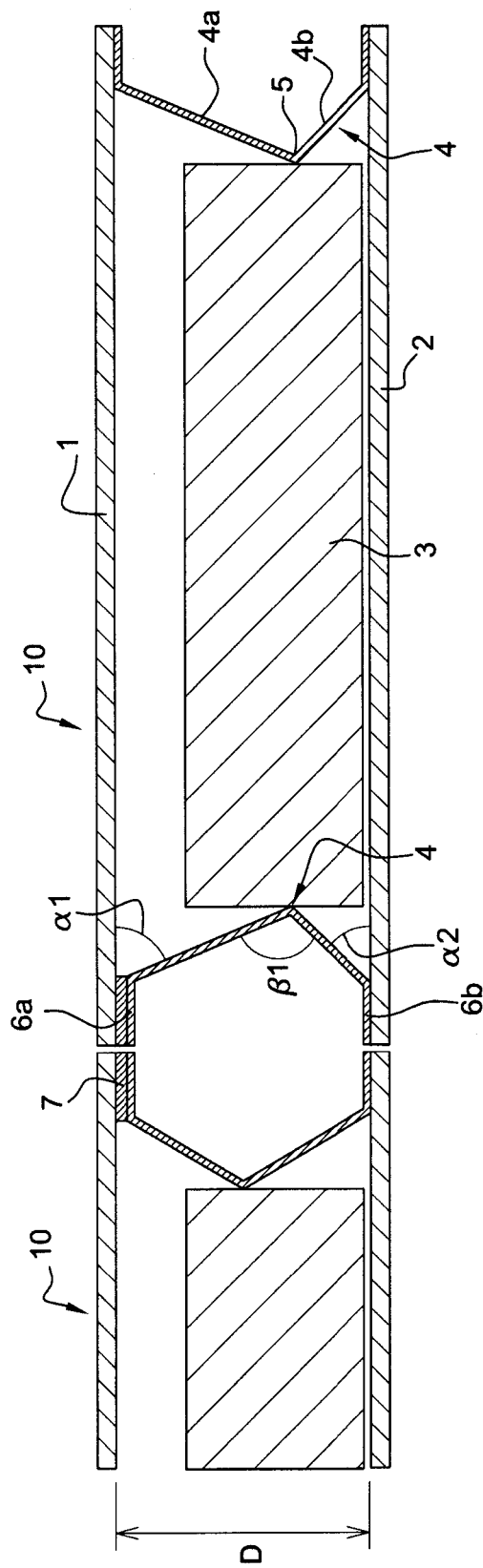
FIG. 3 is a transverse sectional view of a thermo-acoustic protection structure for the rotating machine according to the invention, in compliance with a second execution mode.

FIG. 4 illustrates a generalization of the execution mode of FIG. 1 or 3. It shows that the connecting element 4 may be folded with a curve radius at each fold 5 and the rectilinear portions between the folds 5.

If the length "h" of a straight segment extends towards 0, then a curvilinear profile is found (composed of arcs of circles, sinusoidal profiles or of another type of form), and in this case the same definition of angles may allow imposing parallelism between the upper wall 1 and the lower wall 2 of the panel 10.

According to a fourth execution mode, as illustrated in FIG. 5, each connecting element 4 may include two edges 5a, 5b marking three rectilinear portions 4a, 4b, 4c. The edges 5a, 5b are preferably equidistant from their respective contact area 6a, 6b. Thus, the three portions 4a, 4b, 4c are of a length substantially equal in transverse section.

As the first mode of execution, the connecting element 4 may also include at its ends an upper contact area 6a, intended for the connection of the element 4 with the upper wall 1, and eventually a lower contact area 6b, intended for the connection of the element with the lower wall 2.

Figure 6:
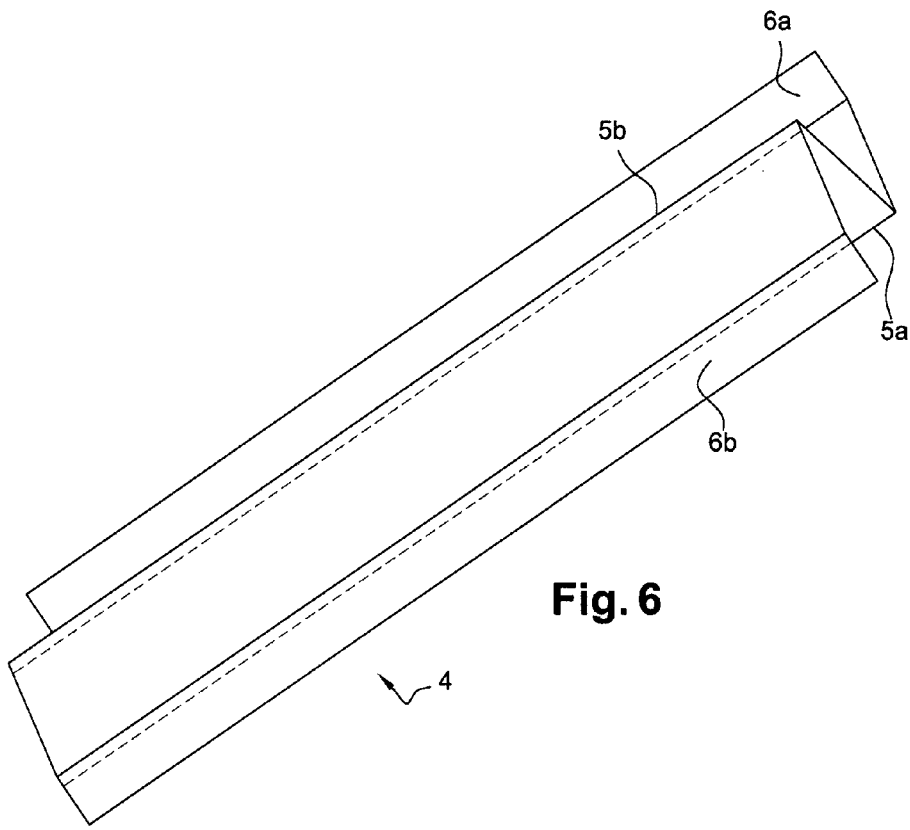
FIG. 6 is a perspective view of the connecting element of FIG. 5.

FIG. 6 illustrates in perspective the connecting element 4 of FIG. 5. The structure of panels 10 of the invention may be a generalization of the form of the connecting element 4 as bearing N longitudinal edges and N+1 rectilinear portions. The distance between two adjacent edges is preferably the same on the entire connecting element 4.

After folding, the angles $\alpha 1$, $\alpha 2$ are less than 90° and advantageously provide the following ratios:

if N=1, $\beta N = a1 + a2$ (±4°)
if N>1, $\beta 1 = \ldots = \beta N = a1 + a2$ (±4°)

These angles may be different but the ratios cited above ensure greater manufacturing simplicity.

Figure 7:
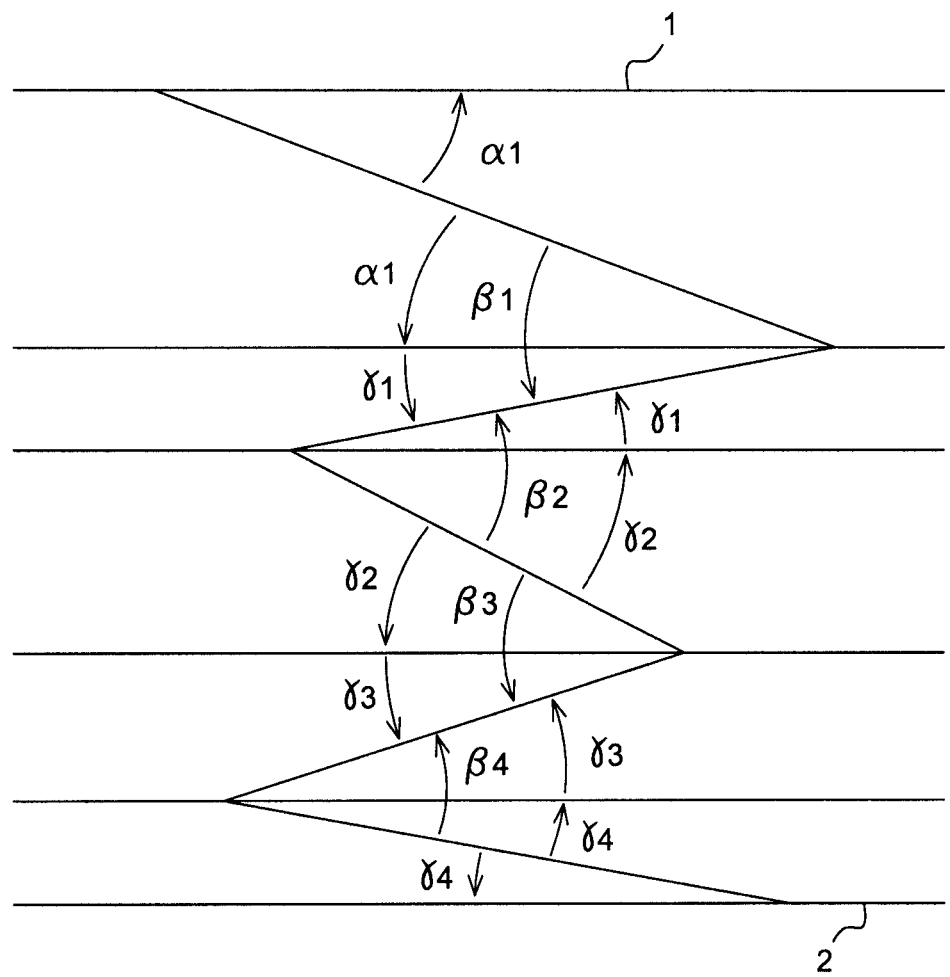
FIG. 7 is a transverse schematic view of a thermo-acoustic protection structure according to the invention, in compliance with a fifth execution mode.

FIG. 7 illustrates an execution mode in which the angles of the panels 10 are different.

The oriented angles in FIG. 7 are defined in the following manner:

$\gamma_1 = \beta_1 - \alpha_1$ $\gamma_2 = \beta_2 - \gamma_1$ $\gamma_3 = \beta_3 - \gamma_2$ $\ldots$ $\gamma_N = \beta_N - \gamma_{N-1}$ (1)

with:
N being the number of folds
a2=□N
Thus, the angle $\alpha 2$ is defined by:

$$\alpha_2 = \gamma_N = (-1)^N \cdot \alpha_1 + \sum_{i=1}^{N} [(-1)^{N-i} \cdot \beta_i] \quad (2)$$

The previous equations (1) verify the equation (2):

$\gamma_1 = -\alpha_1 + \beta_1$ i.e. $\beta_1 = \alpha_1 + \alpha_2$ $\gamma_2 = \beta_2 - \gamma_1 = \alpha_1 - \beta_1 + \beta_2$ $\gamma_3 = \beta_3 - \gamma_2 = -\alpha_1 + \beta_1 - \beta_2 + \beta_3$ The benefits of the invention include simple implementation because the folding of the connecting element may be done with standard tools. Furthermore, the absence of a damper facilitates the assembly and removal while reducing the number of parts necessary for each operation. Furthermore, the fastening of the connecting element may be carried out by standard methods, or by welding, or by detachable fastener, for example with screws and nuts, or by riveting or clamping. The connection between the connecting element 4 and the upper wall 1 is preferably established by a detachable assembly, the detachable fixing being possible due to the space left between the acoustic absorbent material 3 and the upper wall 1.

The process for the assembly of a structure according to the invention may include the following steps:
- At least one connecting element 4 is placed on the surface of a first wall, for example the lower wall 2.
- Welding of the contact area 6b of the connecting element 4 to the first wall 2.
- Filling of all or part of the space between the two walls 1, 2 by one or several layers of absorbent material 3, for example rock wool or glass or other, between the connecting elements 4 and/or the edges of the sheet 2.
- Placing of the upper wall 1 and fixing by detachable assembly of the connecting parts 4 to the surface of the upper wall 1, (in an execution variant, the placing of the upper wall 1 may be carried out before filling between the two walls 1, 2 by the acoustic absorbent material 3).
- Assembly of panels of the structure 10 to provide thermo-acoustic protection around a rotating machine such as a turbine or an alternator.

Figure 8:
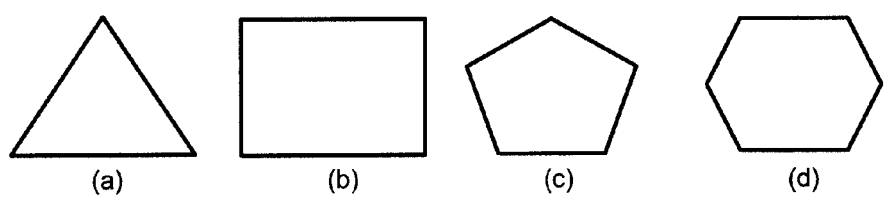
FIG. 8 illustrates in top view the different possible geometries of the thermo-acoustic protection structure.

The upper wall and the lower wall additionally may include means of connection not represented in the figures. Furthermore, and in order to facilitate the assembly of the thermo-acoustic protection structure around a rotating machine, the walls may have various forms allowing better adaptation to the geometry of the machine. For example some structures may include three edges or more as illustrated in FIG. 8. Thus, the structure may be triangular in form (execution mode a), rectangular (execution mode b), pentagonal (execution mode c), or hexagonal (execution mode d). To limit the structure resonance phenomenon, the connecting elements 4 are preferably fixed on at least one surface close to the edge of the walls, with at least one of the contact surfaces 6a and 6b.

The encumbrance may be adjusted by modifying the folding angles. The materials used are standard in the field of gas turbines. Finally, the thickness of the connecting element 4 is preferably between 1 mm (even 0.5 mm) and 6 mm.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A thermo-acoustic protection structure for a rotating machine, comprising: an upper wall and a parallel lower wall, and at least one acoustic absorbent material therebetween, the at least one acoustic absorbent material comprising a planar surface orthogonal to the walls, the upper wall and the lower wall being connected with a plurality of connecting elements of an extended form adjacent to the at least one acoustic absorbent material, each of the plurality of connecting elements presenting, in transverse section, at least one portion, curved or rectilinear, that is non-orthogonal to the walls, a length of the connecting element between the upper wall and the lower wall is greater than a distance between the upper wall and the lower wall, each of the plurality of connecting elements further presenting in transverse section at least one edge in contact with the planar surface, wherein a thickness of the at least one acoustic absorbent material is less than the distance between the upper wall and the lower wall between each pair of the plurality of connecting elements.

2. The structure according to claim 1, wherein the connecting element comprises an upper contact area, intended for the connecting element with the upper wall, and/or a lower contact area, intended for the connecting element with the lower wall, and a plurality of the rectilinear portions or curves, the portions being not parallel and joining each other at an edge that is in contact with the planar surface.

3. The structure according to claim 2, further comprising a damper element of a viscoelastic material placed between the upper contact area and the upper wall and/or between the lower contact area and the lower wall.

4. The structure according to claim 2, wherein a surface between the upper contact area and the edge of the upper wall is between 10 and 20% of the upper wall surface and in that a surface between the lower contact area and the edge of the lower wall is between 10 and 20% of the lower wall surface.

5. The structure according to claim 2, wherein, in transverse section, a length of the lower contact area is greater than 10% of a total length of the connecting element and in that a length of the upper contact area is greater than 10% of the total length of the connecting element.

6. The structure according to claims 1, wherein the acoustic absorbent materials comprise melamine, rock wool, glass, foam, and/or balls.

7. The structure according to claim 1, wherein the thickness of the acoustic absorbent materials is at least equal to 50% of the distance between the lower wall and the upper wall.

8. The structure according to claim 1, wherein fastening of the connecting element to the lower wall and/or the upper wall is carried out by welding.

9. The structure according to claim 1, wherein fastening of the connecting element to the lower wall and/or the upper wall is carried out by detachable fasteners.

10. A thermo-acoustic protection structure for a rotating machine, comprising: an upper wall and a parallel lower wall, and at least one acoustic absorbent material therebetween, the upper wall and the lower wall being connected with a plurality of connecting elements of an extended form, each of the plurality of connecting elements presenting, in transverse section, at least one portion, curved or rectilinear, that is non-orthogonal to the walls, a length of the connecting element between the upper wall and the lower wall is greater than a distance between the upper wall and the lower wall, each of the plurality of connecting elements further presenting in transverse section at least one edge, wherein a thickness of the at least one acoustic absorbent material is less than the distance between the upper wall and the lower wall between each pair of the plurality of connecting elements, wherein the connecting element comprises an upper contact area, intended for the connecting element with the upper wall, and/or a lower contact area, intended for the connecting element with the lower wall, and a plurality of the rectilinear portions or curves, the portions being not parallel and joining each other at an edge, and wherein the connecting element comprises the plurality of rectilinear portions and in that an angle ($\alpha1$) between the upper wall and the upper contact area is equal to an angle ($\alpha2$) between the lower wall and the lower contact area, more or less four degrees, and in that an outer corner at each edge is equal to a sum of the angle ($\alpha1$) between the upper wall and the upper contact area and of the angle ($\alpha2$) between the lower wall and the lower contact surface, more or less four degrees.

* * * * *